No. 647,432. Patented Apr. 10, 1900.
C. T. WHEDON.
APPARATUS FOR BURNING GARBAGE OR OTHER REFUSE MATTER.
(Application filed Sept. 27, 1899.)
(No Model.) 2 Sheets—Sheet 1.
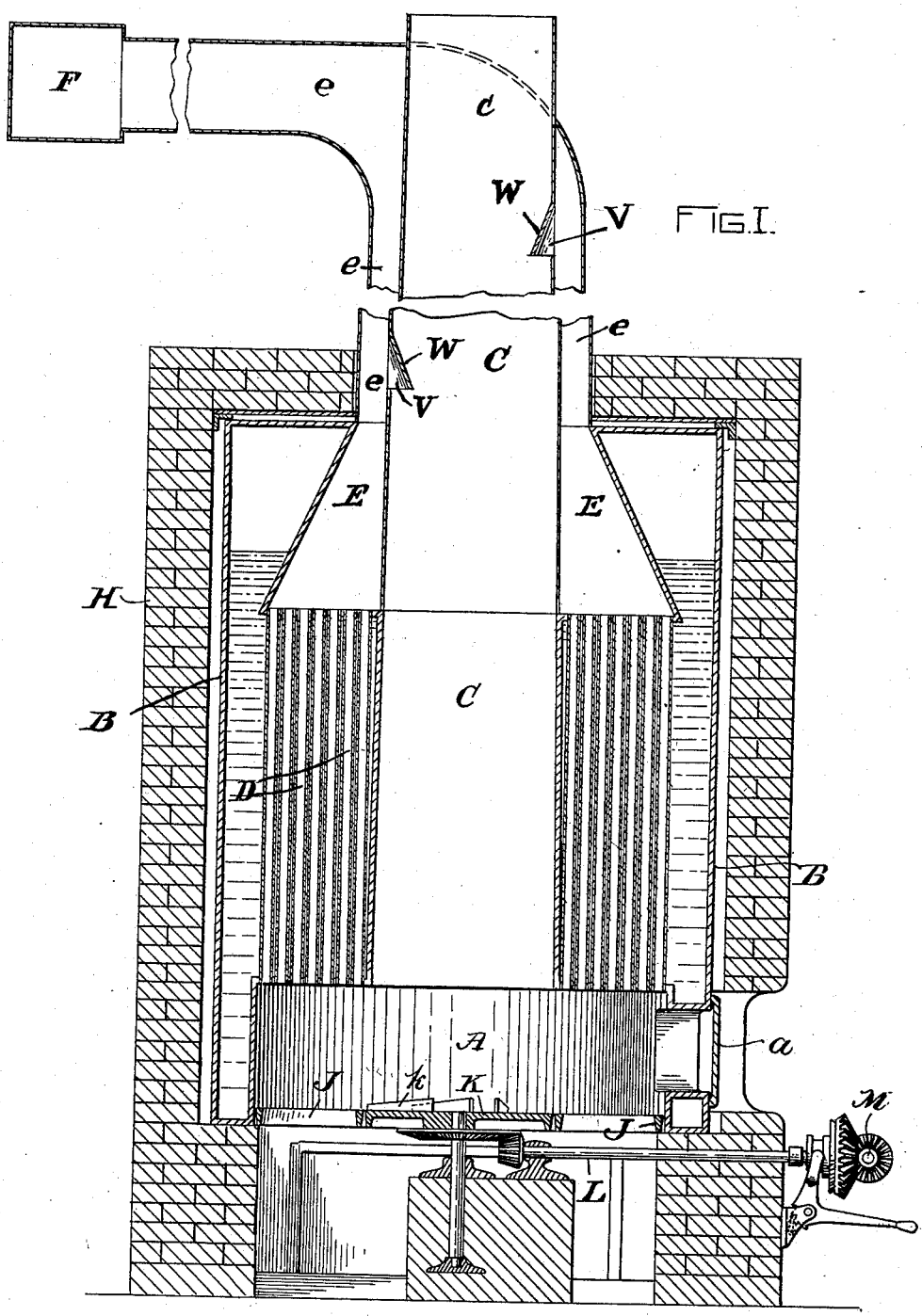

No. 647,432. Patented Apr. 10, 1900.
C. T. WHEDON.
APPARATUS FOR BURNING GARBAGE OR OTHER REFUSE MATTER.
(Application filed Sept. 27, 1899.)
(No Model.) 2 Sheets—Sheet 2.
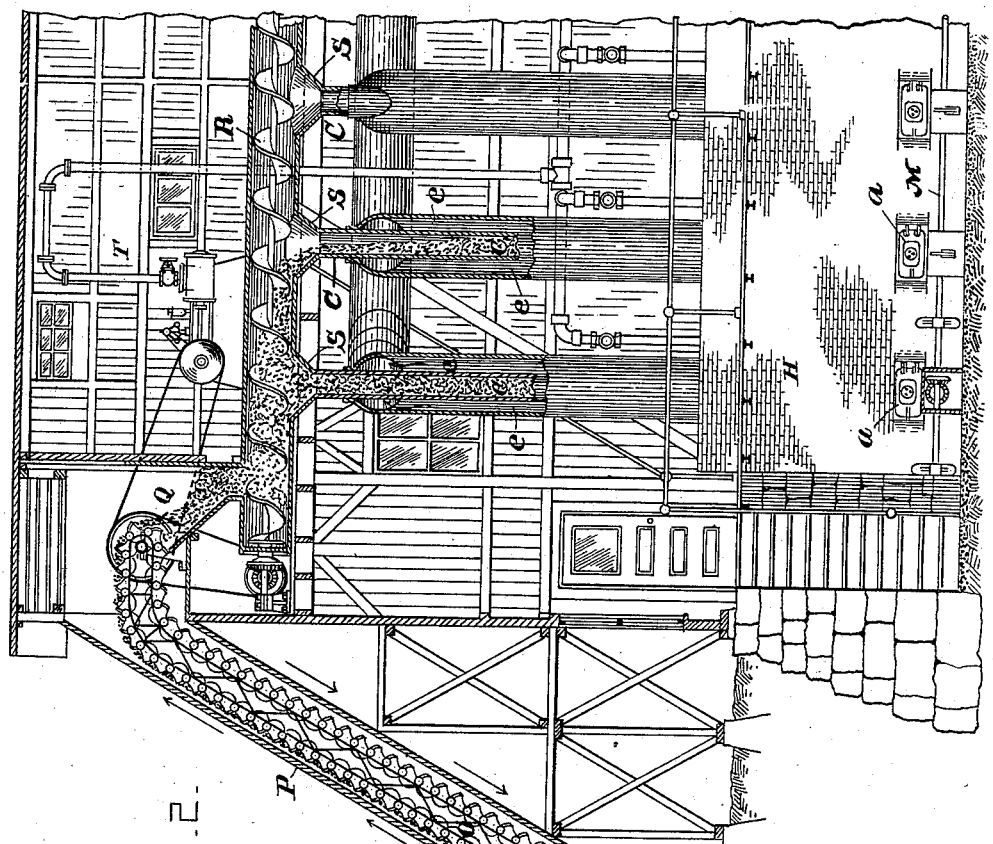
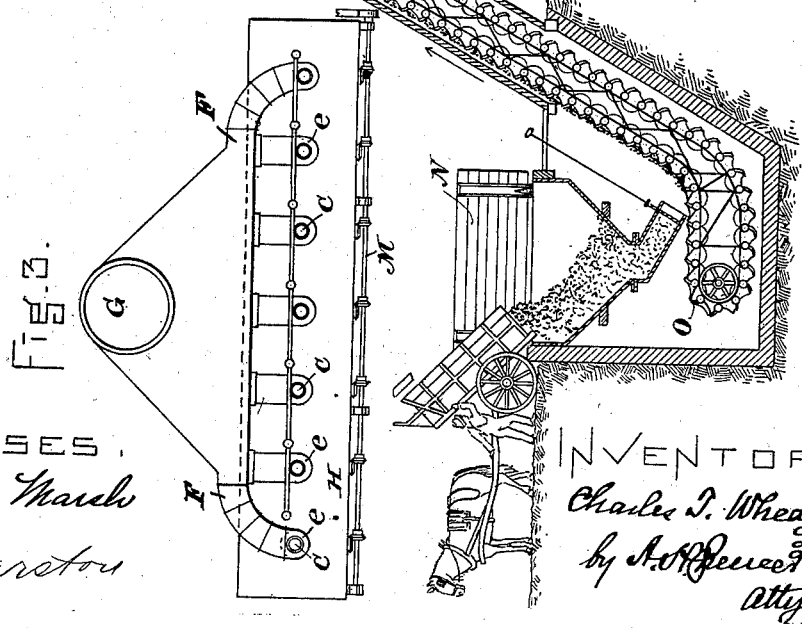
WITNESSES.
R. Henry Marsh
N. B. Marston
INVENTOR.
Charles T. Whedon.
by A. H. Peirce,
Atty.

UNITED STATES PATENT OFFICE.

CHARLES T. WHEDON, OF WHITEFIELD, NEW HAMPSHIRE, ASSIGNOR OF ONE-HALF TO CHARLES HENRY WHEDON, OF SAME PLACE.

APPARATUS FOR BURNING GARBAGE OR OTHER REFUSE MATTER.

SPECIFICATION forming part of Letters Patent No. 647,432, dated April 10, 1900.

Application filed September 27, 1899. Serial No. 731,845. (No model.)

*To all whom it may concern:*

Be it known that I, CHARLES T. WHEDON, of Whitefield, in the county of Coos and State of New Hampshire, have invented certain new and useful Improvements in Apparatus for Burning Garbage or other Refuse Matter, of which the following is a specification.

The object of this invention is to provide improved boilers and apparatus especially designed for the burning of garbage and other refuse matter as fuel, such boilers being preferably arranged in a connected series and provided with feeding apparatus arranged to supply such fuel continuously or at successive intervals. The boiler is of upright type, with central downward feed, and has at the base a central rotatable fuel-supporting grate or disk and a stationary annular fire-grate surrounding said disk. The boiler and its stationary grate are supported on brick walls, forming the foundation of the brickwork which incloses the whole structure, while a central pier in the ash-pit has a suitable step and bearing for a vertical shaft which supports the rotatable grate or disk and the gearing therefor, having a power-shaft extending outwardly therefrom and provided with a suitable clutch apparatus to connect it to or disconnect it from the motor for the series of boilers. Access to the ash-pit and also to the fire-box of the boiler will be had through the side walls when required. Vertical flues surrounding the central fuel-feeding tube connect the fire-box with the smoke-chamber. A water-space surrounds all these within the boiler-shell, the upper part being the steam-space. Feed-water pipes and steam-pipes are provided to keep up the circulation. Fire being started on the grates, fuel is supplied from above, the garbage or refuse becoming thoroughly dried and heated as it gradually descends. The rotation of the central grate, which is provided with obliquely-arranged vertical spreaders, causes the fuel to work outwardly onto the annular grate, where it is consumed, and the water is speedily heated to a high degree.

In the drawings, Figure 1 is a vertical section of one of my improved boilers, showing the internal construction. Fig. 2 is a vertical sectional elevation of suitable elevating and feeding apparatus for supplying to the series of boilers or furnaces the refuse matter to be consumed therein. Fig. 3 is a diagram or plan of a battery comprising a series of furnaces connected to a single smoke-stack.

A represents the fire-box of the boiler or furnace, having a fuel-inlet door *a*.

B is the outer metal shell of the boiler, and C the central feeding-tube, through which garbage or other refuse matter is supplied to be consumed in the fire-box.

D represents the vertical flues, surrounding the central feeding-tube C and extending from the fire-box A upwardly to the smoke-chamber E, such smoke-chamber communicating through pipe *e* with pipe F, leading to the smoke-stack G, Fig. 3, common to all the boilers of the series. Each boiler is surrounded with a substantial brick wall H.

At the bottom of the fire-box is the grate, composed of the stationary annular part J and the central rotatable part K, directly beneath the central supply-tube C. This central rotatable portion of the grate is furnished with oblique wings or spreaders *k*, as shown in Fig. 1, for the purpose of spreading the material or carrying it outwardly onto the annular portion of the grate. The rotatable grate is mounted on a shaft and furnished with suitable beveled gearing and an actuating-shaft L for each furnace, extending outwardly and geared to a horizontal shaft M, Figs. 2 and 3, driven by power and serving to rotate all the movable grates. A suitable clutch is provided to throw into and out of gear the shaft L of any one of the furnaces when desired. (See Fig. 1.)

Referring now to Fig. 2, the garbage or other refuse matter is first deposited in a receptacle N, having a suitable outlet, whence it is delivered to an endless carrying apparatus O, comprising a belt with successive buckets running in an inclined way P and arranged to discharge at a higher level into a hopper Q. From this hopper the material passes into a horizontal box having a spiral conveyer R, extending horizontally over the tubes C of the several furnaces. Suitable openings S are formed in the bottom of the box in which the conveyer revolves, and by gravity the material conveyed passes outwardly into said tubes as fast as space is opened therein by the consumption of matter previously deposited. These tubes C may be somewhat larger at bottom than at top to facilitate the descent of material. The endless elevator-belt and the spiral conveyer are actuated by any suitable power, such as the engine T.

If the garbage is not suitably dried before depositing in the receptacle N, provision for draining or drying it during the passage through the elevator may be made, so as to deliver it into the feeding-tubes of the several furnaces in a condition capable of speedy combustion.

Vent-openings V, Fig. 1, are formed at intervals through the walls of the feeding-tube C for the escape of steam therefrom into the annular smoke-space e, surrounding said tube. Each vent is provided with a shield or guard W, preferably integral with the tube-wall, serving to deflect the material toward the center of the tube and keep the vent open and unobstructed. The draft will be sufficiently strong to carry away with the smoke all steam formed from moisture in the descending material.

The mechanism will be modified in arrangement according to circumstances—as, for instance, the elevator would be materially changed or entirely omitted if the plant were so located that the discharge from the teams would be at or above the level of the other conveying apparatus.

I claim as my invention—

1. In a refuse-burning apparatus, the furnace having a central rotatable grate and a stationary annular grate at the base of the fire-pot, a central vertical feeding-tube for the refuse material, and vertical flues surrounding the lower portion of said tube above the fire-pot, and an annular smoke-chamber above said flues, in combination with the water and steam space surrounding the fire-box, flues and smoke-chamber, and with a funnel surrounding the feeding-tube above the smoke-chamber, so as to heat and dry the material in said tube and promote its combustion, substantially as set forth.

2. In a refuse-burning apparatus, a boiler or furnace having a central grate and fire-pot, a vertical feeding-tube leading to said fire-pot and formed with a series of vent-openings, each provided with an internal deflecting-shield, in combination with vertical flues and a water-space surrounding the lower part of said feeding-tube, and with an annular smoke-passage into which said vents open through the upper part of such tube, substantially as set forth.

In testimony whereof I have affixed my signature in presence of two witnesses.

CHARLES T. WHEDON.

Witnesses:
A. H. SPENCER,
JEROME PRINCE.